(12) United States Patent
Petit

(10) Patent No.: US 6,607,206 B2
(45) Date of Patent: Aug. 19, 2003

(54) AIR CUSHION SUSPENSION ASSEMBLY FOR USE WITH OVER THE ROAD TRUCKS

(76) Inventor: Louie Petit, 1419 Moore St., Fairbanks, AK (US) 99701

(*) Notice: Subject to any disclaimer, the term of this patent is extended or adjusted under 35 U.S.C. 154(b) by 0 days.

(21) Appl. No.: 09/923,220

(22) Filed: Aug. 6, 2001

(65) Prior Publication Data

US 2003/0025288 A1 Feb. 6, 2003

(51) Int. Cl.[7] .............................................. B60G 11/02
(52) U.S. Cl. ........................ 280/124.163; 280/124.17; 267/192
(58) Field of Search ................. 280/124.63, 124.17, 280/124.175, 124.176; 267/192, 229, 246, 64.14

(56) References Cited

U.S. PATENT DOCUMENTS

| | | | | |
|---|---|---|---|---|
| 2,620,181 A | * | 12/1952 | Troche et al. | 267/188 |
| 2,869,891 A | * | 1/1959 | Vendity et al. | 280/124.106 |
| 3,149,690 A | * | 9/1964 | Rosenkrands et al. | 180/360 |
| 3,558,123 A | * | 1/1971 | Yew | 267/34 |
| 3,850,445 A | * | 11/1974 | Borns et al. | 267/31 |
| 4,125,276 A | * | 11/1978 | Levasseur | 280/124.108 |
| 4,181,324 A | * | 1/1980 | Hixon | 280/124.102 |
| 4,397,478 A | * | 8/1983 | Jensen et al. | 267/31 |
| 4,518,171 A | * | 5/1985 | Hedenberg | 280/124.104 |
| 4,705,294 A | * | 11/1987 | Raidel | 280/124.116 |
| 4,711,465 A | * | 12/1987 | Raidel | 267/31 |
| 4,718,693 A | * | 1/1988 | Booher | 267/149 |
| 4,733,876 A | * | 3/1988 | Heider et al. | 280/124.116 |
| 4,998,749 A | * | 3/1991 | Bockewitz | 267/268 |
| 5,024,462 A | * | 6/1991 | Assh | 267/241 |
| 5,172,930 A | * | 12/1992 | Boye et al. | 280/6.157 |
| 5,365,646 A | * | 11/1994 | Stephens | 148/580 |
| 5,470,096 A | * | 11/1995 | Baxter | 267/241 |
| 6,328,324 B1 | * | 12/2001 | Fenton | 280/124.162 |
| 6,394,474 B1 | * | 5/2002 | Warinner et al. | 267/263 |
| 6,406,007 B1 | * | 6/2002 | Wilson | 267/283 |
| 6,428,027 B1 | * | 8/2002 | Stuart | 280/124.157 |

* cited by examiner

Primary Examiner—Paul N. Dickson
Assistant Examiner—Laura B. Rosenberg
(74) Attorney, Agent, or Firm—Joseph S. Heino

(57) ABSTRACT

A front suspension assembly is mountable to a longitudinally extending frame of a truck and includes a pair leaf springs mounted on opposite sides of the frame of the truck at the front, such leaf springs extending backwardly from the front of the truck, a pair of vertically disposed guides extending downwardly from the frame and providing an aperture though which a leaf spring runs, a pair of shock absorbers extending downwardly from the frame of the truck to below the leaf springs and supporting the leaf springs, and a pair of air cushion assemblies each having a bottom attached to the top of the back of one of the leaf springs and a top attached to the frame of the truck.

11 Claims, 2 Drawing Sheets

AIR CUSHION SUSPENSION ASSEMBLY FOR USE WITH OVER THE ROAD TRUCKS

FIELD OF THE INVENTION

The present invention relates generally to the art of vehicle suspension. More specifically, it relates to an assembly for use in the front suspensions of large vehicles, which includes a leaf spring assembly, a shock absorber, a hanger guide, and an air cushion assembly attached to the front axle of a large over the road truck.

BACKGROUND OF THE INVENTION

The art of building suspensions in land transport vehicles is fairly old and very well known. Inventors hundreds of years ago bouncing around in buckboard wagons first identified the need for and designed the earliest forms of land transport suspension. The earliest production motor vehicles carried suspension systems and railroad cars carried suspension systems even before motor vehicles. However, no suspension systems of which this inventor is aware employ such a unique combination of simple elements to improve the ride characteristics of large vehicles, specifically, large trucks.

Rough ride, vehicle deterioration, cargo damage and operator fatigue all result from the almost continuous shock and vibration that is transmitted from the road to the vehicle when it is in motion. A particular problem occurring with prior suspension systems is that of operator fatigue. Long periods of vibration caused by irregular surfaces and jolts from bumps in the road contribute greatly to operator fatigue, and may, over time even cause debilitating injuries to operators.

Previous suspension assemblies employ steel and composite springs to dampen vibration and bumps. A problem with these assemblies is that the springs must be designed to carry the maximum load of the vehicle. Therefore, when a truck is empty or only partially loaded, the suspension systems are too stiff to allow the amount or degree of suspension deflection that is necessary to prevent vibration and shock from being transmitted from the road.

Generally speaking, the endurance and load carrying capacity requirements of trucks overshadow the requirements of the operators of the truck. This inventor has however, recognized the necessity of an improvement in the art of truck design that reduces the translation of vibration and bumps to the operator of the vehicle.

Air cushioned suspensions have evolved to address many of the problems associated with the varying loads accommodated by over the road vehicles. However, this inventor is not aware of any improvements using air cushioned suspension systems on the front axle of a truck for improved operator comfort. The device of the present invention improves driver comfort by providing an air cushioned assembly to dampen vibration and surface irregularities.

Another problem of prior suspension assemblies that are used on the front axle of large trucks is that they have no mechanism to prevent sway. The device of the present invention provides a pair of vertically disposed guides in which the leaf springs may travel up and down and a crosspiece that connects one guide to the other. Combined, these two components reduce the amount of sway the driver of the truck experiences.

SUMMARY OF THE INVENTION

It is therefore a principal object of the present invention to provide a new, useful and uncomplicated assembly that improves operator comfort by reducing vibration, increasing spring deflection and reducing sway without detriment to the vehicle's load carrying ability. It is also an object of the present invention to employ air cushion technology in the front axle of large trucks. It is a further object of the present invention to provide such a device that can be easily installed on existing trucks and on new trucks. It is a yet another object of the present invention to provide a "bolt-on" device so that operators may retrofit their vehicles for improved comfort. It is also an object of the present invention to provide an apparatus that can be easily manufactured and that can be made with a minimum number of parts.

The device of the present invention obtains these objects. The device of the present invention provides for a front suspension assembly that absorbs vibration, reduces the impact of road irregularities on the operator of the vehicle and reduces vehicle sway. The device of the present invention does not reduce the vehicle's carrying capacity, is easily installed and is comprised of readily available parts. In order to meet these objects, the device of the present invention provides a pair leaf springs mounted on opposite sides of the frame of the truck at the front and extending backwardly from the front of the truck, a pair of vertically disposed guides extending down from the frame and providing an aperture through which a leaf spring runs, a pair of shock absorbers extending downwardly from the frame of the truck to below the leaf springs and supporting the leaf springs, and a pair of air cushion assemblies each having a bottom attached to the top of the back of one of the leaf springs and a top attached to the frame of a truck. Lastly, the device of the present invention provides a simple assembly of only a few new parts and requires little maintenance. The foregoing and other features of the device of the present invention will be further apparent from the detailed description that follows.

DETAILED DESCRIPTION

Figure 1:
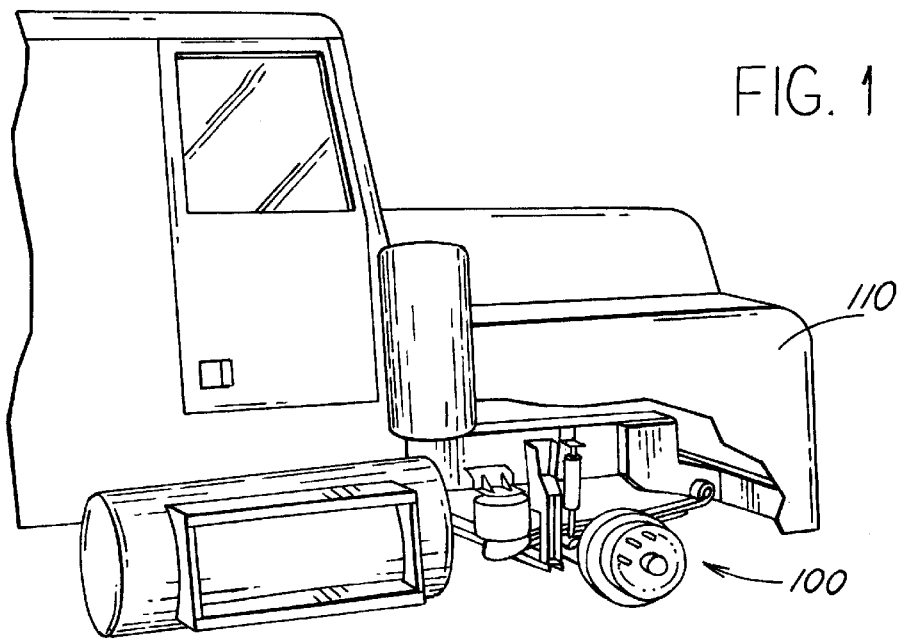
FIG. 1 is a rear and left (passenger) side view of a truck that utilizes a suspension assembly constructed in accordance with the present invention.
Figure 2:
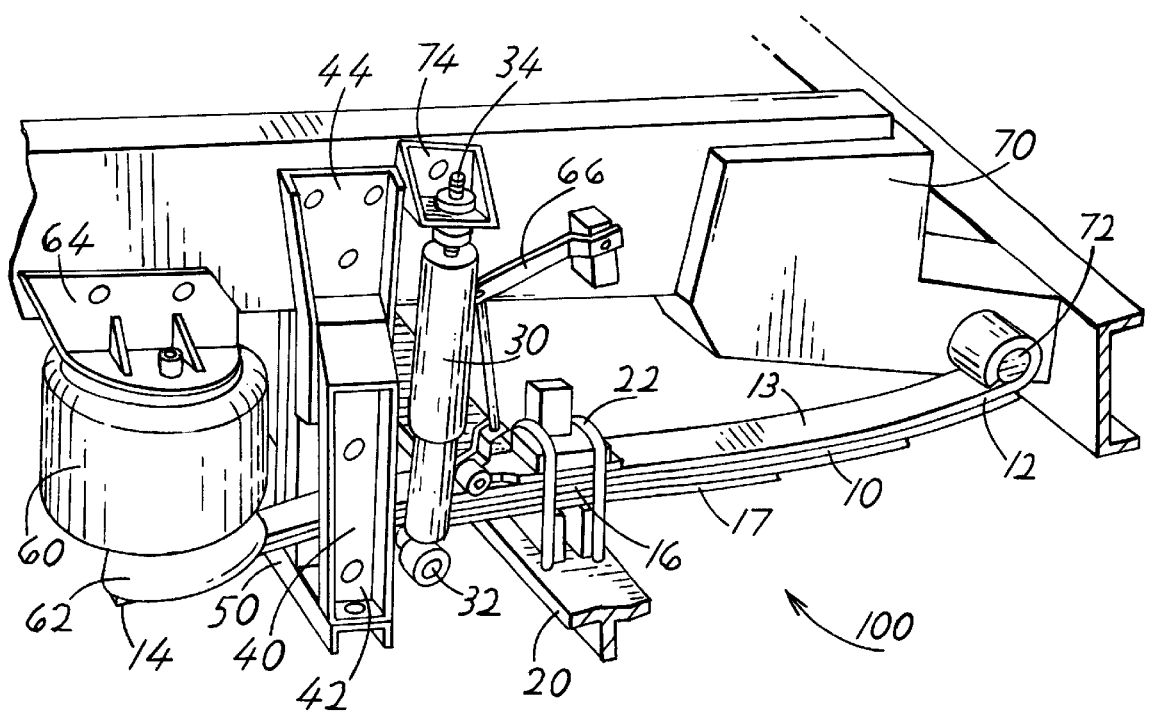
FIG. 2 is an enlarged top, rear and left side perspective view of the suspension assembly shown in FIG. 1.

Referring now to the drawings in detail, wherein like numbered numerals represent like elements throughout, FIG. 1 illustrates a suspension assembly, generally identified 100, constructed in accordance with the present invention. Distilled to its essence, the device of the current invention consists generally of a leaf spring, a shock, a hanger, a crosspiece and an air cushion assembly.

As shown in FIG. 1, a preferred embodiment of the suspension assembly, generally identified 100, of the present invention is shown installed in the front of a large truck 110. While the device of the present invention is not meant to be limited to use in any particular make or model of truck, it is convenient to display a rather generic vehicle to provide a frame of reference. It should be understood from this detailed description that, as installed, the suspension assembly is identical on each side of the vehicle. However, for ease of explanation and drawing, only one side of the truck is pictured and explained in this detailed description.

Generally, the suspension assembly 100 includes a leaf spring 10, an axle 20, a shock 30, a guide 40, a crosspiece 50 and an air cushion assembly 60. From the front of the suspension assembly backward to the rear, the suspension assembly 100 includes a first end 12 of a leaf spring 10 fastened to the frame 70 of the vehicle 110. Near the middle of the leaf spring 10, the front axle 20, is fastened to the leaf spring 10. Towards the back end 14 of the leaf spring 10 a shock 30 is attached to a curled under leaf of a leaf spring 10. The second end 14 of the leaf spring 10 is fastened to the bottom 62 of the air spring 60. Each of the components of the suspension assembly 100 will be discussed in turn later in this detailed description.

Figure 3:
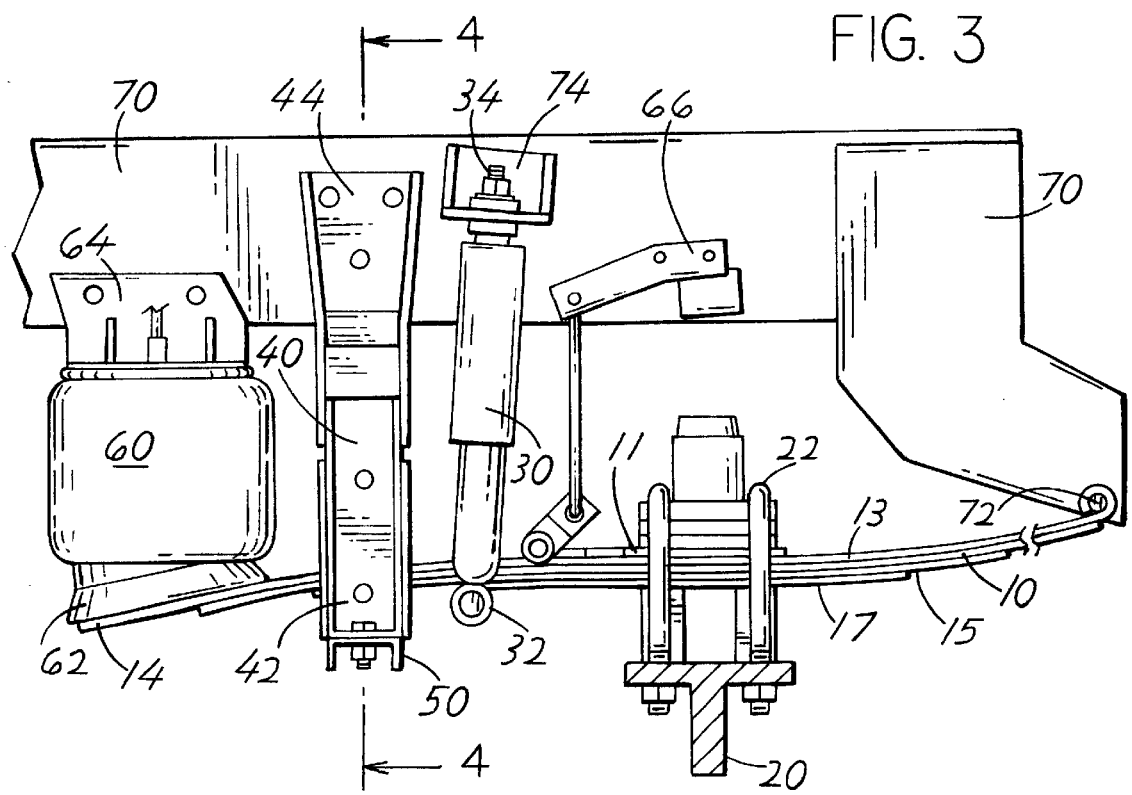
FIG. 3 is a left side elevational view of the suspension assembly.
Figure 4:
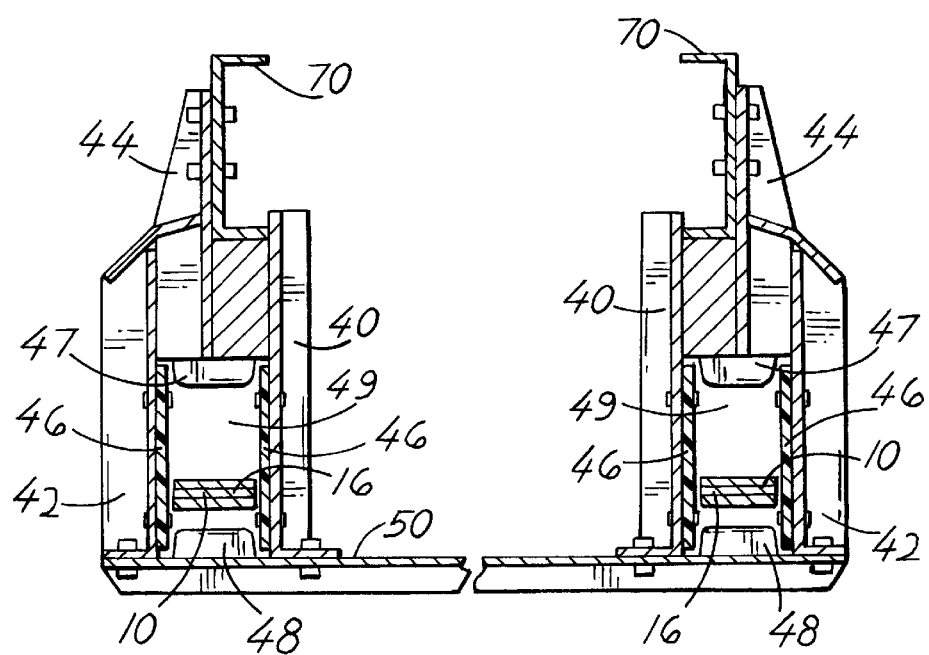
FIG. 4 is front view of the hanger utilized in the assembly of the present invention and taken along line 4—4 of FIG. 3.

According to one preferred embodiment, the leaf spring 10 has a first end 12 curled around a frame protrusion 72, a mid point 16 upon which the axle 20 is attached, a bottom leaf 17 curled around the second end 32 of the shock 30 and a rear portion 14 attached to the bottom 62 of an air spring 60. See FIG. 3. The leaf spring 10 also runs through a guide 40 that is located between the shock 30 and the air cushion 60. See FIG. 4.

In one embodiment the leaf spring 10 has several leaves including at least a top leaf 11, a second leaf 13, a third leaf 15 and a fourth, or bottom leaf 17. The top leaf 11 of the leaf spring 10 is the shortest, running only from underneath the axle attachment bracket 22 to the air spring sensor 66. The second leaf 13 in the leaf spring 10 curls around the frame protuberance 72 and extends rearwardly to the bottom 62 of the air cushion 60. The third leaf 15 is situated underneath the second leaf 13 but is shorter than the second leaf 13. The fourth leaf 17 is situated underneath the third leaf 15 and is shorter than the third leaf 15. The fourth leaf 17 curls around the first end 32 of the shock 30. The leaf spring 10 need not curl around the protuberance in the frame or the shock. It should be noted that any method of fastening could be used to attach the leaf spring to the frame 70 of the truck 110 and the shock 30 could be used without departing from the scope of the assembly of the present invention.

Under load, the leaf spring is bent into an "S-shape". The first end 12 of the leaf spring 10 bends concavely up between the first end 12 of the leaf spring 10 and the axle 20. The leaf spring then reverses this bend between the axle 20 and the air cushion 60, bending concavely downward to form this "S-shape".

The air spring 60 has a first end 62 attached to the leaf spring 10 and a second end 64 attached to the frame 70 of the vehicle 110. The air spring 60 has a sensor 66 that regulates the pressure inside the air cushion 60. Air spring suspension designs offer several advantages over metal springs, one of the most important of which is the possibility of controlling the spring rate. Inherently, the force required to deflect the air unit increases with greater deflection, because the air is compressed into a smaller space and greater pressure is built up, thus progressively resisting further deflection. Thus, air cushioning devices reduce vibration and bumps more effectively regardless of the load placed upon them.

In order to further dampen vibration and bumps, the device of the present invention also includes a shock 30 with a first end 34 attached to the frame bracket 74 and a second end 32 attached to one of the leaves of the leaf spring 10.

The device of the present invention employs a guide 40 and crosspiece 50 to prevent the vehicle 110 from swaying as it travels over bumps. The guide 40 has a first end 44 attached to the frame 70 of the vehicle 110, a generally rectangular aperture, or eye 48, through which a portion of the leaf spring 10 rides, and a second end 42 attached to a crosspiece 50. The guide 40 includes a pair of Teflon® wear plates 46. The leaf spring 10 runs between the Teflon® wear plates 46 so that the leaf spring 10 may move freely in a vertical direction. The crosspiece 50 is attached to the second end 42 of the guide 40 on each side of the vehicle 110. In this manner, leaf springs 10 are supported from both sides to prevent any type of sway motion caused by either wind catching the cab or the road surface. In a preferred embodiment, the guide allows approximately 5 inches of suspension travel before the leaf spring 10 bumps against a top rubber stopper 47 or a bottom rubber stopper 48.

The axle 20 is attached to the leaf spring 10 with a U-shaped bolt 22. As with other areas of attachments in this disclosure, any type of fastener will suffice and the use of a U-shaped bolt is not a limitation of this device. In the preferred embodiment, the axle 20 is attached midway between the shock 30 and the first end 12 of the leaf spring 10.

Thus, the leaf spring 10, shock 30 and air cushion 60 work together to dampen vibration and reduce the impact of surface irregularities to the driver. At the same time the guide 40 and crosspiece 50 provide structural rigidity and prevent sway. These improvements to the suspension improve the ride of a truck; which increases operator comfort and reduces operator fatigue, vehicle deterioration and damage to cargo.

The foregoing description of an embodiment of the invention has been presented for purposes of illustration. It is to be understood that variations in the details of construction, the arrangement and combination of parts, and the types of materials used may be made without departing from the spirit and scope of the invention as defined by the claims appended hereto.

The principles of this invention having been fully explained in connection with the foregoing, I hereby claim as my invention:

1. A front suspension assembly which is mountable to a longitudinally extending frame of a vehicle, said vehicle including a front axle, which is comprised of a pair of longitudinally extending spring means generally situated parallel to the frame each of said spring means having a first end and a second end, a pair of vertically extending guides designed to prevent side to side motion of the spring means mounted directly across from each other having a first end attached to the frame, a second end and a rectangular aperture having a top horizontal surface, a bottom horizontal surface and a pair of opposed vertical side surfaces, each of said vertical surfaces having a wear plate removably mounted on the vertical surfaces of the aperture to protect the vertical surfaces of the aperture, said aperture permitting passage of the spring means therethrough and further permitting vertical translation of said spring means therewithin, means for attaching the front axle to said spring means, a rigid crosspiece attached to the second end of each of the guides such that horizontal translation of the front axle is prevented, a pair of air cushions each having a first upper end attached to the frame and a second lower end attached to the second end of the spring means, a pair of means for adjusting the air pressure within each of said air cushions, and means for mechanically absorbing surface irregularities, wherein the spring means is bent concavely upwardly forwardly of the axle and between the axle and first end of the spring means and concavely downwardly rearwardly of the axle and between the axle and the second end of the spring means.

2. The suspension assembly of claim 1 wherein said spring means consists of a pair of leaf springs attached to the frame of a vehicle directly across from each other comprised of several individual leaves with at least one leaf having a first end fastened to the frame of the vehicle and a second end attached to the lower end of the air cushion.

3. The suspension assembly of claim 2 wherein said means for mechanically absorbing surface irregularities consists of a pair of shocks mounted on the frame across from each other each having a top end attached to the frame forward of the guide and a bottom end attached to the leaf spring.

4. The suspension assembly of claim 3 wherein an axle is attached onto each of the leaf springs between the first end of the leaf springs and spot where the shock is attached.

5. The suspension assembly of claim 4 wherein an air cushion control regulates the air pressure within the air cushion.

6. The suspension assembly of claim 5 wherein some or all of the suspension assembly is made of a composite material.

7. The suspension assembly of claim 2 wherein the rectangular aperture allows the leaf springs approximately 5 inches of vertical travel.

8. A front suspension assembly mounted on the frame of a vehicle wherein the vehicle frame has a front portion, a left side, and a right side and includes a front axle, the suspension assembly comprised of pair of leaf springs attached to the frame of the vehicle directly across from one another each having a first end attached to the front of the frame of the vehicle and a second end, each leaf spring being bent concavely upwardly between the first end of the leaf spring and the axle and concavely downwardly between the axle and the second end of the air cushion, a pair of air cushions mounted on the frame directly across from each other each having a top end attached to the frame and a bottom end attached to the second end of the leaf spring, a pair of guides mounted on the frame directly across from one another each having a top end attached to the frame forward of the air cushion and a bottom end, a crosspiece connecting the bottom end of the guide on the left side of the frame of the vehicle with the bottom end of the guide on the right side of the frame of the vehicle, a rectangularly shaped aperture disposed in each of the guides having a top wall, a bottom wall and a pair of vertical side walls, said walls being configured to permit vertical translation of the leaf spring but prevent horizontal translation of the leaf spring, a pair of wear plates mounted on the inside vertical walls of each guide aperture, a pair of shocks mounted on the frame across from each other each having a top end attached to the frame forward of the guide and a bottom end attached to the leaf spring, and an axle attached to each of the leaf springs between the first end of the leaf springs and that portion to which the shock is attached.

9. The suspension assembly of claim 8 wherein an air cushion control regulates the air pressure within the air cushion.

10. The suspension assembly of claim 9 wherein some or all of the suspension assembly is made of a composite material.

11. The suspension assembly of claim 10 wherein the rectangular aperture allows the leaf springs approximately 5 inches of vertical travel.

\* \* \* \* \*